(12) United States Patent
Huang et al.

(10) Patent No.: US 10,172,182 B2
(45) Date of Patent: Jan. 1, 2019

(54) EFFICIENT OPERATION OF USER EQUIPMENT IN A WIRELESS COMMUNICATION NETWORK

(71) Applicant: Telefonaktiebolaget LM Ericsson (Publ), Stockholm (SE)

(72) Inventors: Vincent Huang, Sollentuna (SE); Mona Matti, Nacka (SE); Ying Sun, Sundbyberg (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/030,239

(22) PCT Filed: Nov. 7, 2013

(86) PCT No.: PCT/SE2013/051307
§ 371 (c)(1),
(2) Date: Apr. 18, 2016

(87) PCT Pub. No.: WO2015/069156
PCT Pub. Date: May 14, 2015

(65) Prior Publication Data
US 2016/0242230 A1    Aug. 18, 2016

(51) Int. Cl.
*H04W 76/04*    (2009.01)
*H04W 72/04*    (2009.01)
(Continued)

(52) U.S. Cl.
CPC ....... *H04W 76/28* (2018.02); *H04W 28/0205* (2013.01); *H04W 28/0268* (2013.01);
(Continued)

(58) Field of Classification Search
CPC ............. H01M 2/1066; H01M 2/0267; H01M 10/0565; H01M 2220/30; H01M 10/0525; H04B 1/3883
See application file for complete search history.

(56) References Cited

U.S. PATENT DOCUMENTS 6,330,248 B1 * 12/2001 Krishna .................. H04L 25/14
370/447
2008/0101268 A1    5/2008 Sammour et al.
(Continued)

FOREIGN PATENT DOCUMENTS

EP    2 661 138 A1    11/2013
GB    2493713 A1    2/2013
(Continued)

OTHER PUBLICATIONS

Supplementary European Search Report dated Sep. 16, 2016 for European Regional Phase Application Serial No. 13 897 058.7-1855, European Regional Phase Entry Date: Apr. 4, 2016 consisting of 4-pages.
(Continued)

*Primary Examiner* — Kamran Afshar
*Assistant Examiner* — Minjung Kim
(74) *Attorney, Agent, or Firm* — Sage Patent Group

(57) ABSTRACT

A method of operating a User Equipment, UE, in a wireless communication network. The UE is configured for Discontinuous Reception, DRX, operation with a DRX cycle having a DRX ON period in which the UE is in a DRX awake state and ready for reception and a DRX OFF period in which the UE is in a DRX sleep state. The UE determines whether an uplink packet to be transmitted is delay tolerant. The UE delays, when the uplink packet is regarded as delay tolerant, a request for an uplink transmission grant for the uplink packet until a DRX ON period of the UE. By delaying the request for an uplink transmission grant for a delay
(Continued)

tolerant uplink packet until a DRX ON period of the UE, the UE does not have to wake up to listen to the response from the network during the DRX OFF period.

10 Claims, 13 Drawing Sheets

(51) Int. Cl.
*H04W 76/28* (2018.01)
*H04W 72/12* (2009.01)
*H04W 52/02* (2009.01)
*H04W 28/02* (2009.01)

(52) U.S. Cl.
CPC ... *H04W 52/0235* (2013.01); *H04W 52/0258* (2013.01); *H04W 72/0413* (2013.01); *H04W 72/12* (2013.01); *H04W 52/0216* (2013.01); *H04W 72/1284* (2013.01); *Y02D 70/1262* (2018.01); *Y02D 70/23* (2018.01); *Y02D 70/24* (2018.01)

(56) References Cited

U.S. PATENT DOCUMENTS

| | | | |
|---|---|---|---|
| 2009/0116399 A1* | 5/2009 | Ho | H04L 47/10 370/252 |
| 2009/0239568 A1* | 9/2009 | Bertrand | H04W 52/0225 455/522 |
| 2012/0120831 A1* | 5/2012 | Gonsa | H04W 76/15 370/252 |
| 2012/0233481 A1 | 9/2012 | Henttonen et al. | |
| 2013/0021995 A1 | 1/2013 | Ehsan et al. | |
| 2013/0210420 A1 | 8/2013 | Deivasigamani et al. | |
| 2013/0250828 A1 | 9/2013 | Chou et al. | |
| 2014/0286256 A1* | 9/2014 | Chowdhury | H04L 47/56 370/329 |
| 2015/0092643 A1* | 4/2015 | Khay-Ibbat | H04W 52/0203 370/311 |

FOREIGN PATENT DOCUMENTS

| | | |
|---|---|---|
| WO | 2007149732 A1 | 12/2007 |
| WO | 2013067677 A1 | 5/2013 |

OTHER PUBLICATIONS

3GPP TSG-RAN WG2 #19bis, Tdoc R2-124962, Title: DRX During UL Scheduling, Agenda Item: 7.8, Source: Ericsson, ST-Ericsson, Broadcom, Qualcomm, Document for Discussion, Decision, Conference Location and Date: Bratislava, Slovakia, Oct. 8-12, 2012 consisting of 8-pages.

European First Examination Report dated Jan. 31, 2017 for European Regional Phase Application Serial No. 13 897 058.7-1855, European Regional Phase Entry Date: Apr. 4, 2016 consisting of 5-pages.

PCT Notification Concerning Transmittal of International Preliminary Report on Patentability Form/PCT/IB/326, dated May 10, 2016 for International Application Serial No. PCT/IB2013/051307, International Filing Date—Nov. 7, 2013 consisting of 10-pages.

International Search Report and Written Opinion dated Jul. 1, 2014 for International Application Serial No. PCT/IB2013/051307, International Filing Date—Nov. 7, 2013 consisting of 21-pages.

\* cited by examiner

EFFICIENT OPERATION OF USER EQUIPMENT IN A WIRELESS COMMUNICATION NETWORK

TECHNICAL FIELD

The proposed technology generally relates to a method of operating a User Equipment, UE, in a wireless communication network, a corresponding UE and a wireless device as well as a computer program for operating, when executed by a processor, a wireless device in a wireless communication network, and a method performed by a radio network node for configuring a UE for operation in a wireless communication network and a corresponding radio network node.

BACKGROUND

It is a general demand to reduce the power consumption of wireless devices such as UEs or mobile user terminals in wireless communications. Reduced power consumption evidently leads to battery savings, which is an important feature of wireless devices.

Discontinuous Reception, DRX, is a mechanism to conserve battery power in wireless devices and UEs. A UE is then normally configured for DRX operation with a DRX cycle having a DRX ON period in which the UE is in a DRX awake state and ready for reception and a DRX OFF period in which the UE is in a DRX sleep state, as illustrated in FIG. 1. During the DRX OFF period, which is sometimes referred to as the inactivity period, the UE turns its receiver off and enters power saving mode, or sleep state. The length of the DRX ON period combined with the length of the DRX OFF period determines the length of a DRX cycle, which may be periodically repeated. Normally, the network side decides the DRX timing so that the network transmissions can be synchronized with the UE wake-up periods.

Various attempts have been made to develop and improve the design and use of the DRX mechanism.

For example, two types of DRX cycles have been introduced; a long DRX cycle and a short DRX cycle. If no data is received during a short DRX cycle, the UE may switch to a long DRX cycle, which is much more power efficient.

In reference [1] it is proposed to only turn on the UE transceiver for a subset of DRX cycles, e.g. based on the quality of the radio environment.

In reference [2] it is proposed to adapt the length of the DRX cycle based on the available battery power of the mobile device.

In reference [3] it is proposed to delay transmission of a scheduling request based on the DRX time cycle to prevent repeated interruption of the DRX cycle.

In reference [4] it is proposed to schedule the transmission time of uplink frames to occur when the device has powered up so that it can receive a downlink frame.

There is still a general demand for improvements with regard to the design and use of the DRX mechanism in wireless communication networks.

SUMMARY

It is an object to reduce the power consumption of a User Equipment, UE, or wireless device when the UE or wireless device is operating in Discontinuous Reception, DRX, mode.

It is a specific object to provide an efficient method of operating a User Equipment, UE, in a wireless communication network.

It is another specific object to provide an improved UE configured for operation in a wireless communication network.

Yet another specific object is to provide an improved a wireless device for operation in a wireless communication network.

Still another object is to provide an effective computer program for operating, when executed by a processor, a wireless device in a wireless communication network.

It is also an object to provide a method performed by a radio network node for configuring a User Equipment, UE, for operation in a wireless communication network.

Another object is to provide a radio network node operable for configuring a User Equipment, UE, for operation in a wireless communication network.

These and other objects are met by embodiments of the proposed technology.

A careful analysis by the inventors has revealed that even for a UE operating in DRX mode there is still further room for improvements with respect to power consumption. In DRX mode, the UE traditionally transmits a request for an uplink transmission grant immediately, or at least as soon as possible, when an uplink packet is generated, and the UE therefore has to wake up from DRX sleep state, whenever there is an uplink packet in the packet buffer of the UE, to be able to listen to the subsequent uplink grant response from the network. This negatively affects the power consumption of the UE, and the inventors have pin-pointed a possibility to further reduce the power consumption in DRX mode by differentiating the handling of uplink packets with different delay requirements.

According to a first aspect, there is provided a method of operating a User Equipment, UE, in a wireless communication network. The UE is configured for Discontinuous Reception, DRX, operation with a DRX cycle having a DRX ON period in which the UE is in a DRX awake state and ready for reception and a DRX OFF period in which the UE is in a DRX sleep state. Basically, the UE determines whether an uplink packet to be transmitted is delay tolerant, and delays, when the uplink packet is regarded as delay tolerant, a request for an uplink transmission grant for the uplink packet until a DRX ON period of the UE.

By delaying the request for an uplink transmission grant for a delay tolerant uplink packet until a DRX ON period of the UE, the UE does not have to wake up to listen to the response from the network during the DRX OFF period and can therefore stay in DRX sleep mode for a longer period of time. This reduces power consumption and leads to significant battery savings in the UE.

According to a second aspect, there is provided a User Equipment, UE, configured for operation in a wireless communication network. The UE is configured for Discontinuous Reception, DRX, operation with a DRX cycle having a DRX ON period in which the UE is in a DRX awake state and ready for reception and a DRX OFF period in which the UE is in a DRX sleep state. The UE is further configured to determine whether an uplink packet to be transmitted is delay tolerant. The UE is also configured to delay, when the uplink packet is regarded as delay tolerant, a request for an uplink transmission grant for the uplink packet until a DRX ON period of the UE.

This provides an implementation for enabling reduced power consumption and battery savings in the UE in an efficient way.

According to a third aspect, there is provided a wireless device for operation in a wireless communication network. The wireless device is configured for Discontinuous Reception, DRX, operation with a DRX cycle having a DRX ON period in which the wireless device is in a DRX awake state and ready for reception and a DRX OFF period in which the wireless device is in a DRX sleep state. The wireless device comprises a determination module for determining whether an uplink packet to be transmitted is delay tolerant. The wireless device also comprises a delay module for causing, when the uplink packet is regarded as delay tolerant, a delay of the uplink packet in dependence on the DRX state of the wireless device.

This provides an implementation for enabling reduced power consumption and battery savings in the wireless device in an efficient way.

According to a fourth aspect, there is provided a computer program for operating, when executed by a processor, a wireless device in a wireless communication network. The wireless device is configured for Discontinuous Reception, DRX, operation with a DRX cycle having a DRX ON period in which the wireless device is in a DRX awake state and ready for reception and a DRX OFF period in which the wireless device is in a DRX sleep state. The computer program comprises instructions executable by the processor, whereby the processor is operative to determine whether an uplink packet to be transmitted is delay tolerant, and to cause, when the uplink packet is regarded as delay tolerant, a delay of the uplink packet in dependence on the DRX state of the wireless device.

This provides a computer program for enabling reduced power consumption and battery savings in the wireless device in an efficient way.

According to a fifth aspect, there is provided a method performed by a radio network node for configuring a User Equipment, UE, for operation in a wireless communication network. Basically, the radio network node allocates transmission opportunities to the UE for transmitting requests for uplink transmission grants in dependence on the DRX ON period of a DRX cycle of the UE, and transmits configuration information representative of the allocated transmission opportunities to the UE for enabling configuration of the UE.

This provides efficient support for reduced power consumption on the UE side. The radio network node may thus configure the UE for enabling power efficient operation.

According to a sixth aspect, there is provided a radio network node operable for configuring a User Equipment, UE, for operation in a wireless communication network. The radio network node is configured to allocate transmission opportunities to the UE for transmitting requests for uplink transmission grants in dependence on the DRX ON period of a DRX cycle of the UE. The radio network node is further configured to transmit configuration information representative of the allocated transmission opportunities to the UE for enabling configuration of the UE.

This provides a radio network node operable for supporting reduced power consumption on the UE side.

According to a seventh aspect, there is provided a radio network node operable for configuring a User Equipment, UE, for operation in a wireless communication network. The radio network node 200 comprises an allocation module 260 for allocating transmission opportunities to the UE for transmitting requests for uplink transmission grants in dependence on the DRX ON period of a DRX cycle of the UE. The radio network node further comprises a preparation module for preparing for transmission of configuration information representative of the allocated transmission opportunities to the UE.

This provides an alternative implementation for supporting reduced power consumption on the UE side.

Other advantages will be appreciated when reading the detailed description.

BRIEF DESCRIPTION OF THE DRAWINGS

The embodiments, together with further objects and advantages thereof, may best be understood by making reference to the following description taken together with the accompanying drawings, in which.

DETAILED DESCRIPTION

Throughout the drawings, the same reference signs are used for similar or corresponding elements.

As used herein, the non-limiting terms "User Equipment" and "wireless device" may refer to a mobile phone, a cellular phone, a Personal Digital Assistant, PDA, equipped with radio communication capabilities, a smart phone, a laptop or Personal Computer, PC, equipped with an internal or external mobile broadband modem, a tablet PC with radio communication capabilities, a target device, a device to device UE, a machine type UE or UE capable of machine to machine communication, iPAD, customer premises equipment, CPE, laptop embedded equipment, LEE, laptop mounted equipment, LME, USB dongle, a portable electronic radio communication device, a sensor device equipped with radio communication capabilities or the like. The term "UE" and the term "wireless device" should be interpreted as non-limiting terms comprising any type of wireless device communicating with a radio network node in a cellular or mobile communication system or any device equipped with radio circuitry for wireless communication according to any relevant standard for communication within a cellular or mobile communication system.

As used herein, the non-limiting term "radio network node" may refer to base stations, network control nodes such as network controllers, radio network controllers, base station controllers, and the like. In particular, the term "base station" may encompass different types of radio base stations including standardized base stations such as Node Bs, or evolved Node Bs, eNBs, and also macro/micro/pico radio base stations, home base stations, also known as femto base stations, relay nodes, repeaters, radio access points, base transceiver stations, BTSs, and even radio control nodes controlling one or more Remote Radio Units, RRUs, or the like.

As previously mentioned, the inventors have recognized that even for a UE operating in DRX mode there is still further room for improvements with respect to power consumption.

In DRX mode, the UE traditionally transmits a request for an uplink transmission grant immediately, or at least as soon as possible, when an uplink packet is generated, and the UE therefore has to wake up from DRX sleep state, whenever there is an uplink packet in the packet buffer of the UE, to be able to listen to the subsequent uplink grant response from the network. In Long Term Evolution, LTE, for example, if uplink data is available in the UE, the UE normally sends a Scheduling request, SR, on the Physical Uplink Control Channel, PUCCH, and turns its receiver on to be able to monitor the Physical Downlink Control Channel, PDCCH, for the corresponding UL grant.

This negatively affects the power consumption of the UE, and the inventors have pin-pointed a possibility to further reduce the power consumption in DRX mode by differentiating the handling of uplink packets with different delay requirements.

Figure 1:
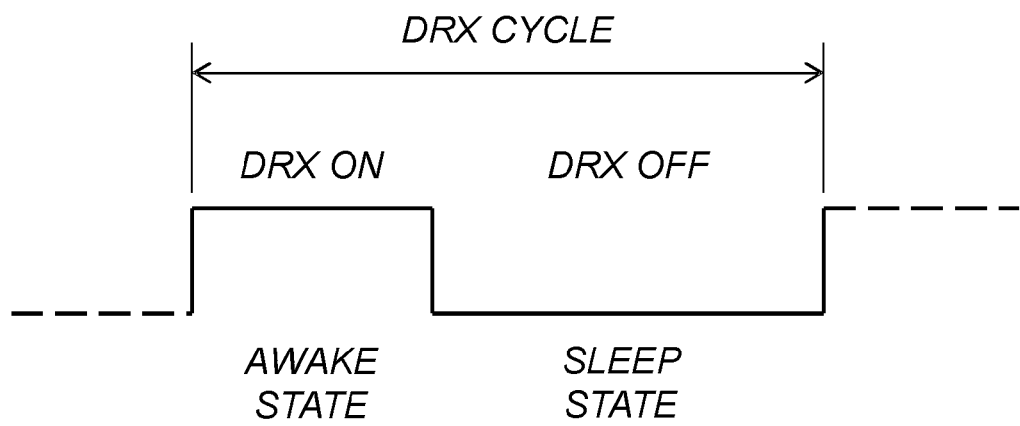
FIG. 1 is a schematic diagram illustrating an example of a basic DRX cycle.
Figure 2:
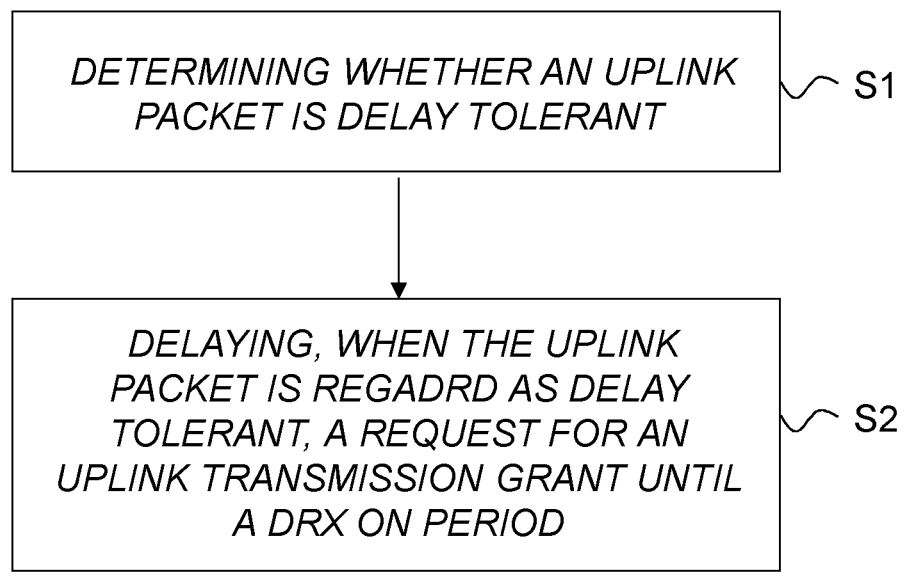
FIG. 2 is a schematic flow diagram illustrating an example of a method of operating a User Equipment, UE, in a wireless communication network according to an embodiment.

FIG. 2 is a schematic flow diagram illustrating an example of a method of operating a User Equipment, UE, in a wireless communication network according to an embodiment. The UE is configured for Discontinuous Reception, DRX, operation with a DRX cycle having a DRX ON period in which the UE is in a DRX awake state and ready for reception and a DRX OFF period in which the UE is in a DRX sleep state. In step S1, the UE is determining whether an uplink packet to be transmitted is delay tolerant. In step S2, the UE is delaying, when the uplink packet is regarded as delay tolerant, a request for an uplink transmission grant for the uplink packet until a DRX ON period of the UE.

By delaying the request for an uplink transmission grant for a delay tolerant uplink packet until a DRX ON period of the UE, the UE does not have to wake up to listen to the response from the network during the DRX OFF period. The UE can thus stay in DRX sleep mode for a longer period of time. This reduces power consumption and leads to significant battery savings in the UE.

Transmission of the grant request for a delay-tolerant uplink packet is usually delayed until the next DRX ON period, but the proposed technology is not limited thereto and the grant request can be delayed until any future DRX ON period, depending on the delay requirements.

In other words, a request for an uplink transmission grant is normally delayed for delay tolerant uplink packets until a DRX ON period of the UE.

As an example, the request for an uplink transmission grant is only delayed when the uplink packet is regarded as delay tolerant. For delay sensitive uplink packets, the UE normally triggers transmission of the grant request directly when the uplink packet is available in the transmit buffer of the UE. In other words, the UE may directly trigger transmission of the request for an uplink transmission grant when the uplink packet is regarded as delay sensitive.

In a particular example, the step S2 of delaying the request for an uplink transmission grant until a DRX ON period of the UE is based on keeping track of the DRX state by means of a timer that counts down to the start of the DRX ON period, or by means of a DRX state tracker which indicates the DRX state.

Figure 3A:
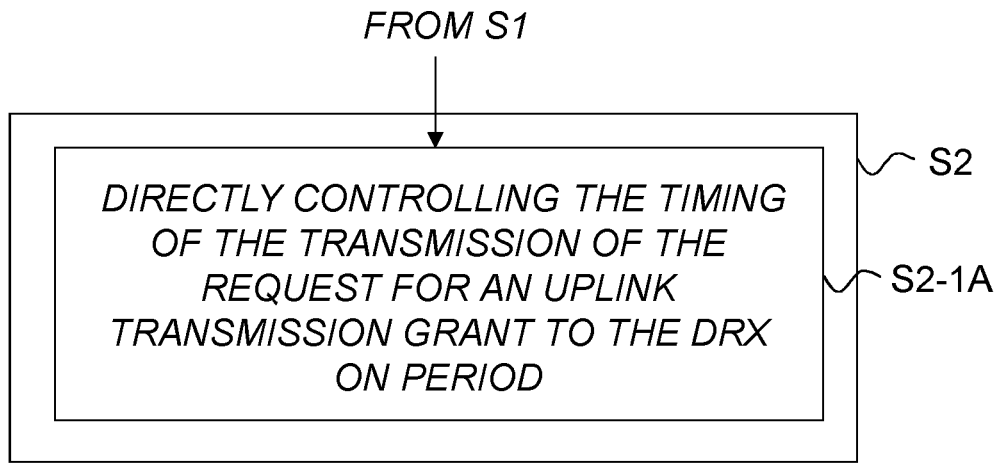
FIG. 3A is a schematic flow diagram illustrating an example of the step of delaying the request for an uplink transmission grant according to a particular embodiment.

FIG. 3A is a schematic flow diagram illustrating an example of the step of delaying the request for an uplink transmission grant according to a particular embodiment. In this example, the step S2 of delaying, when the uplink packet is regarded as delay tolerant, a request for an uplink transmission grant until a DRX ON period of the UE comprises the step S2-1A of directly controlling the timing of the transmission of the request for an uplink transmission grant to the DRX ON period.

Figure 3B:
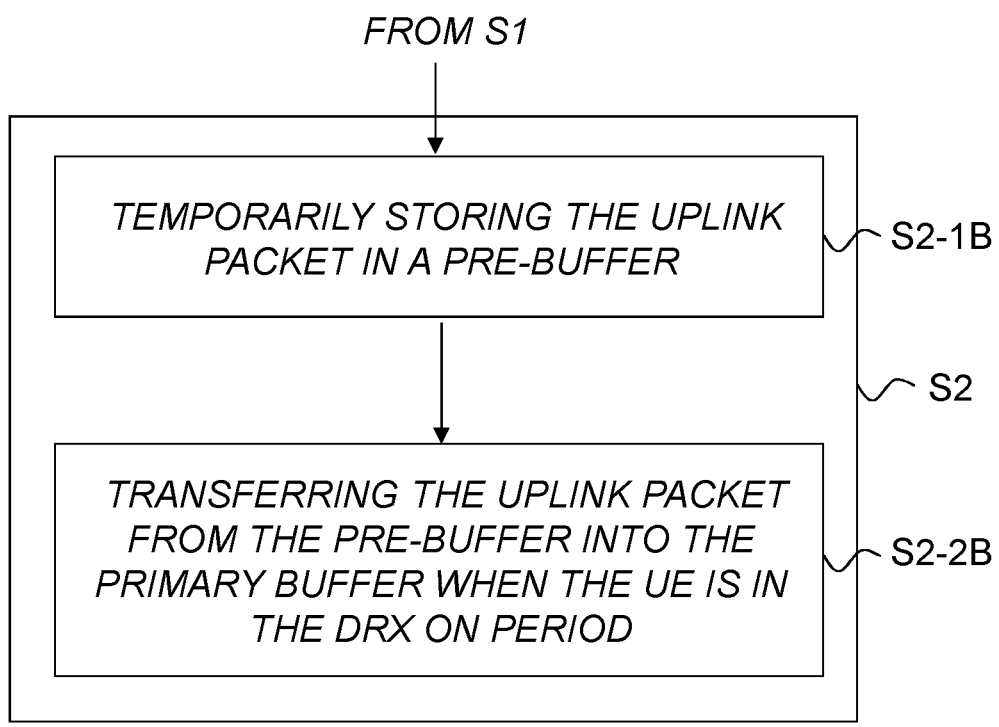
FIG. 3B is a schematic flow diagram illustrating an example of the step of delaying the request for an uplink transmission grant according to another particular embodiment.

FIG. 3B is a schematic flow diagram illustrating an example of the step of delaying the request for an uplink transmission grant according to another particular embodiment. In this particular example, the UE has a primary packet buffer operable for storing the uplink packet, and also a packet pre-buffer. The step S2 of delaying, when the uplink packet is regarded as delay tolerant, a request for an uplink transmission grant until a DRX ON period of the UE comprises the following steps:

temporarily storing, in step S2-1B, the uplink packet in a packet pre-buffer;
  transferring, in step S2-2B, the uplink packet from the packet pre-buffer into the primary packet buffer when the UE is in the DRX ON period, wherein the presence of an uplink packet in the primary packet buffer triggers transmission of the request for an uplink transmission grant.

The proposed technology is generally applicable for reducing power consumption in UEs operating in DRX mode, where a request-grant procedure is employed. In particular, the proposed technology may be used with the Evolved Universal Terrestrial Radio Access, E-UTRA, Medium Access Control, MAC, protocol. The proposed technology is valid for UE DRX operation, and especially in Connected Mode DRX.

As an example, the request for an uplink transmission grant may be a Scheduling Request, SR, to be transmitted on the Physical Uplink Control Channel, PUCCH, for requesting uplink transmission resources for the uplink packet.

Figure 4:
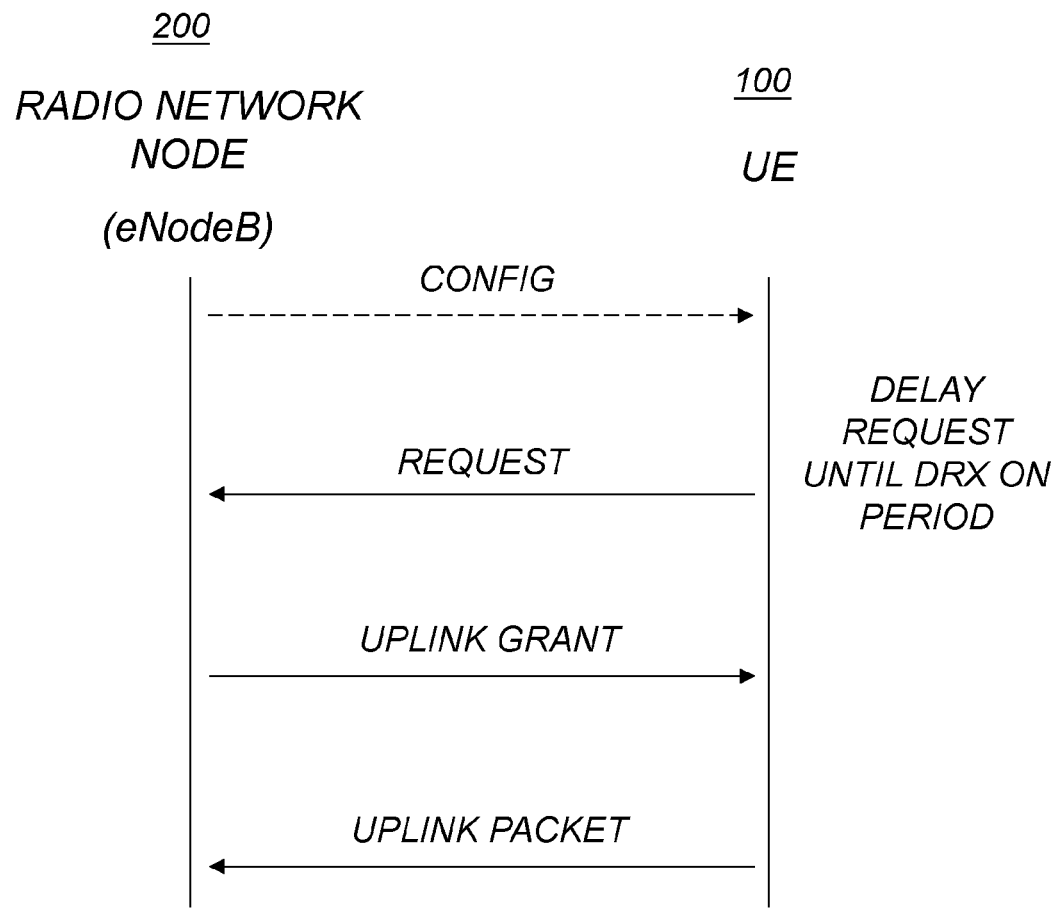
FIG. 4 is a schematic signaling diagram illustrating an example of signaling between a radio network node and a UE according to an embodiment.

FIG. 4 is a schematic signaling diagram illustrating an example of signaling between a radio network node and a UE according to an embodiment. The UE 100 selectively, depending on whether or not the uplink packet is delay tolerant, delays a request for uplink transmission grant until a DRX ON period of the UE. If the uplink packet is delay sensitive, the request for an uplink transmission grant is normally transmitted without delay, whereas the request is delayed for a delay tolerant uplink packet. The request is ultimately transmitted from the UE 100 to a radio network node 200 such as an eNodeB. The radio network node 200 may then use an uplink packet scheduler for scheduling and assigning an uplink grant in response to the received request. The uplink grant is then transmitted from the radio network node 200 to the requesting UE 100, and the uplink packet may subsequently be transmitted from the UE 100 to the radio network node 200 in accordance with the uplink grant.

As indicated by the dashed line, configuration information may optionally be transmitted from the radio network node 200 to the UE for enabling configuration of the UE.

By way of example, the configuration information may include information for configuring the UE for Discontinuous Reception, DRX, operation with a DRX cycle having a DRX ON period in which the UE is in a DRX awake state and ready for reception and a DRX OFF period in which the UE is in a DRX sleep state. The configuration information may also include information representative of allocated transmission opportunities for transmitting requests, such as SR requests, for uplink grants, as well as information representative of the final uplink grants.

In the following, the proposed technology will be described with reference to non-limiting examples. As indicated above, in conventional DRX mode, an uplink packet is always sent immediately, or at least as soon as possible, when it arrives at the uplink buffer. However, the user experience may not always be affected by short uplink latency. For example, if an email is sent one second later or a social media status update takes 0.5 seconds longer to update, there is a minimal impact to the user experience. Furthermore, in some situations, the user experience is not the main objective to be optimized for. For example, in battery critical situations, the performance can be compromised in order to prolong the battery life time. Another example is the transmission of Voice over IP, VoIP, Silence Indicator, SID, packets which are not particularly delay sensitive. However, the traditional procedure to frequently wake the UE up from OFF to ON in DRX operation will cause a relatively large power consumption, especially when the inactivity timer is large. In other words, based on the recognition that some uplink packets are not time critical, such as email, social media status updates, VoIP SID packets and so forth, the inventors propose an improved DRX mode operation.

As a baseline, it should be determined whether or not an uplink packet is delay tolerant. In other words, uplink packets should preferably be identified as delay tolerant or delay sensitive. Sometimes a delay tolerant uplink packet is also referred to as a delay insensitive or delay non-sensitive packet. For example, this can be done by categorizing applications, e.g. email and file uploading. VoIP SID packets can be regarded as delay tolerant, while gaming and VoIP TALK packets are regarded as delay sensitive. The identification or categorization can for example be done by packet inspection below the IP-layer; or in the case of multiple Radio Access Bearers, RABs, based on which RAB the data is placed on; or based on the fact that different applications use different special sockets, APIs, port numbers, IP addresses or by use of an application table for distinguishing already in the operating system whether the data is delay tolerant or not. The network side may provide a QoS classification with respect to delay to the UE side. In a particular example, it is therefore proposed to delay the grant request or scheduling request for non-sensitive packets until the DRX ON period, while for delay sensitive packets, the uplink transmission of the grant request or scheduling request can be triggered immediately. In the latter case, the request is normally transmitted at the next available transmission opportunity scheduled for such requests.

It will be appreciated that the methods and devices described herein can be combined and re-arranged in a variety of ways.

For example, embodiments may be implemented in hardware, or in software for execution by suitable processing circuitry, or a combination thereof.

The steps, functions, procedures, modules and/or blocks described herein may be implemented in hardware using any conventional technology, such as discrete circuit or integrated circuit technology, including both general-purpose electronic circuitry and application-specific circuitry.

Particular examples include one or more suitably configured digital signal processors and other known electronic circuits, e.g. discrete logic gates interconnected to perform a specialized function, or Application Specific Integrated Circuits, ASICs.

Alternatively, at least some of the steps, functions, procedures, modules and/or blocks described herein may be implemented in software such as a computer program for execution by suitable processing circuitry including one or more processing units.

The flow diagram or diagrams presented herein may therefore be regarded as a computer flow diagram or diagrams, when performed by one or more processors. A corresponding apparatus may be defined as a group of function modules, where each step performed by the processor corresponds to a function module. In this case, the function modules are implemented as a computer program running on the processor.

Examples of processing circuitry includes, but is not limited to, one or more processors such as microprocessors, one or more Digital Signal Processors, DSPs, one or more Central Processing Units, CPUs, video acceleration hardware, and/or any suitable programmable logic circuitry such as one or more Field Programmable Gate Arrays, FPGAs, or one or more Programmable Logic Controllers, PLCs.

It should also be understood that it may be possible to re-use the general processing capabilities of any conventional device or unit in which the proposed technology is implemented. It may also be possible to re-use existing software, e.g. by reprogramming of the existing software or by adding new software components.

Figure 5:
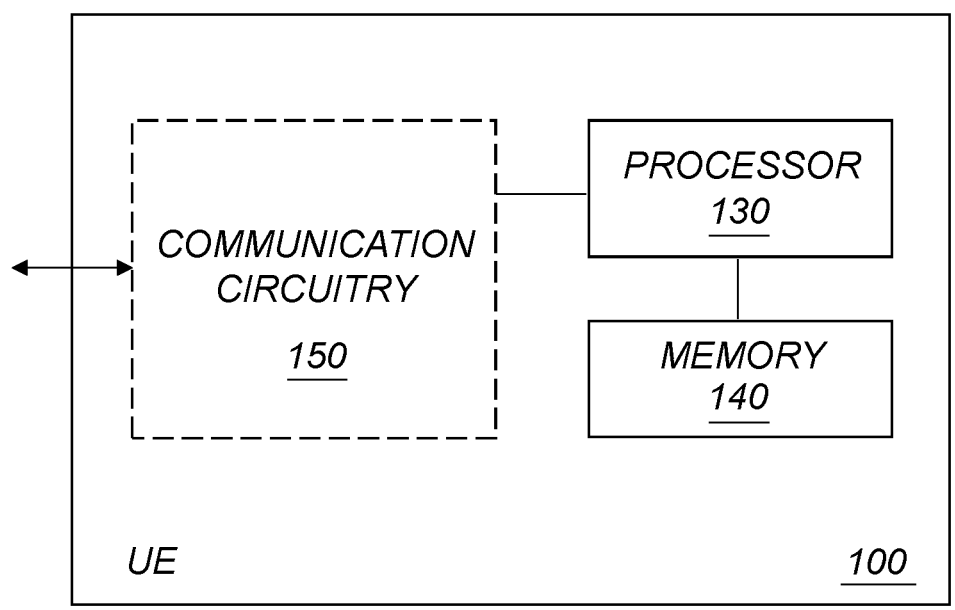
FIG. 5 is a schematic block diagram illustrating an example of a UE according to an embodiment.

FIG. 5 is a schematic block diagram illustrating an example of a UE according to an embodiment. The UE 100 is configured for operation in a wireless communication network and for Discontinuous Reception, DRX, operation with a DRX cycle having a DRX ON period in which the UE is in a DRX awake state and ready for reception and a DRX OFF period in which the UE is in a DRX sleep state. In this particular example, the UE 100 is also configured to determine whether an uplink packet to be transmitted is delay tolerant. Further, the UE 100 is configured to delay, when the uplink packet is regarded as delay tolerant, a request for an uplink transmission grant for the uplink packet until a DRX ON period of the UE.

By way of example, the UE 100 is configured to keep track of the DRX state by means of a timer that counts down to the start of the DRX ON period, or by means of a DRX state tracker which indicates the DRX state.

As exemplified in FIG. 5, the UE 100 may include a processor 130 and a memory 140. Preferably, the memory 140 comprises instructions executable by the processor 130 to perform the relevant operations of the UE.

Optionally, the UE may also include communication circuitry 150 for wireless communication with one or more other nodes, including transmitting and/or receiving information. This may for example be radio communication circuitry such as a radio transceiver.

As previously exemplified, the request for an uplink transmission grant may be a Scheduling Request, SR, to be transmitted on the Physical Uplink Control Channel, PUCCH, for requesting uplink transmission resources for the uplink packet.

Figure 6:
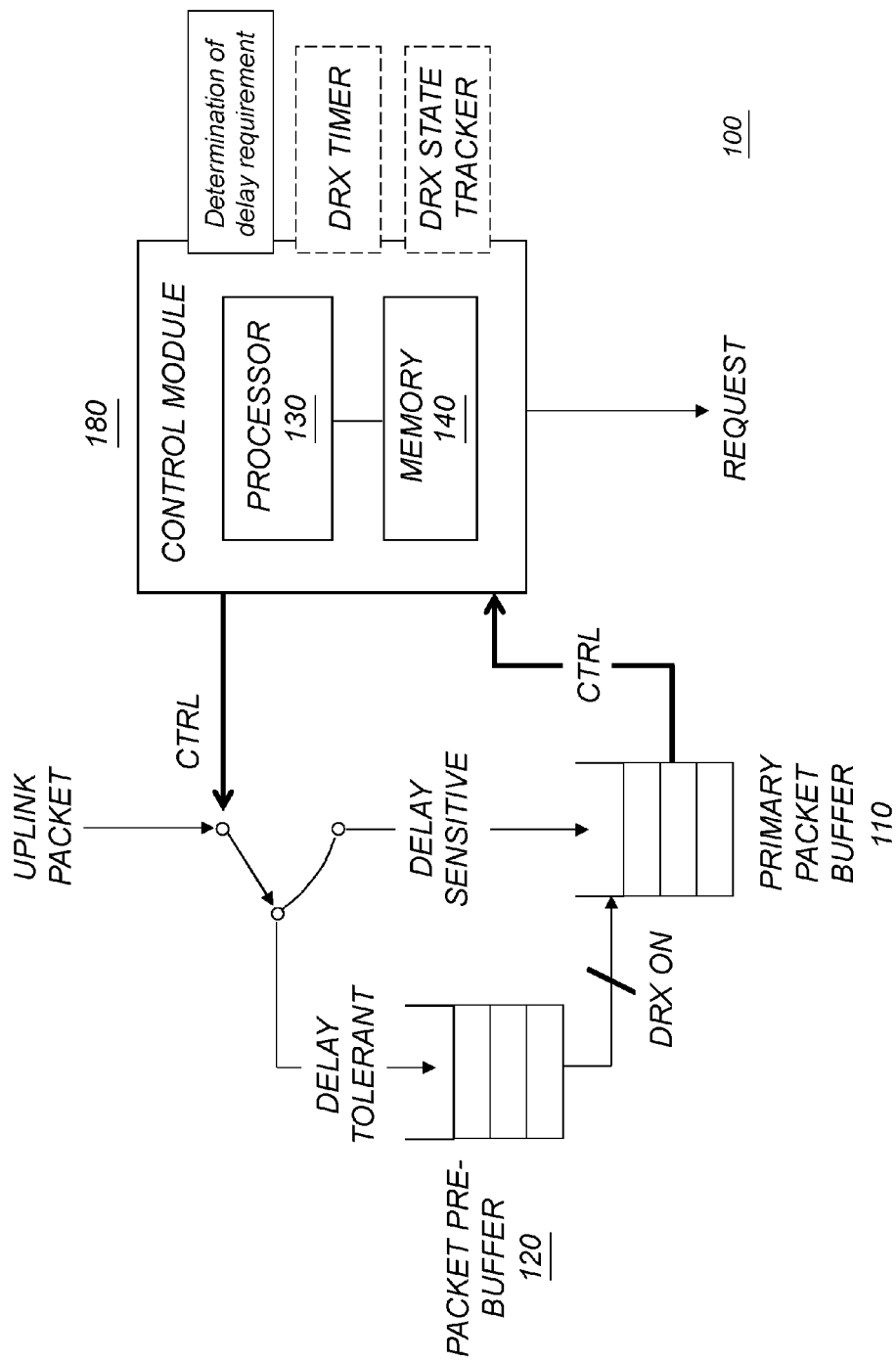
FIG. 6 is a schematic block diagram illustrating an example of a UE/wireless device according to a particular embodiment.

FIG. 6 is a schematic block diagram illustrating an example of a UE/wireless device according to a particular embodiment. The UE/wireless device 100 illustrated in FIG. 6 is based on a processor 130 and an associated memory 140.

In this particular example, the UE 100 has a primary packet buffer 110 operable for storing the uplink packet. Normally, the presence of an uplink packet in the primary packet buffer 110 triggers transmission of the request for an uplink transmission grant. This is in alignment with the conventional mechanism, where a scheduling request is triggered as soon as an uplink packet is available in the uplink packet buffer of the UE. However, in order to delay the request for an uplink transmission grant for those uplink packets that are delay tolerant, the UE 100 is preferably configured to temporarily store the uplink packet in a packet pre-buffer 120, and to subsequently transfer the uplink packet from the packet pre-buffer 120 into the primary packet buffer 110 when the UE is in the DRX ON period.

In the example of FIG. 6, the processor 130 and memory 140 are arranged in a control module 180, which is configured to perform the determination of the delay requirement. In other words, the control module 180 is configured to perform the determination of whether an uplink packet to be transmitted is delay tolerant, and generate a corresponding control signal CTRL to control the forwarding of the packet either to the packet pre-buffer 120, when the uplink packet is delay tolerant, or directly to the primary packet buffer 110 when the uplink packet is delay sensitive.

For example, the control module 180 may be configured to keep track of the DRX state by means of a DRX timer that counts down to the start of the DRX ON period, or by means of a DRX state tracker which indicates the DRX state.

Any packet in the packet pre-buffer 120 is transferred into the primary packet buffer 110 when the UE is in the DRX ON period, e.g. as indicated by the DRX timer or the DRX state tracker.

When packet(s) is/are available in the primary packet buffer 110, a control signal CTRL is sent to the control module 180, which may then trigger a request for uplink transmission grant for each packet in the primary buffer 110.

The alignment of the grant requests with the DRX ON period becomes dynamic. For example, with the pre-buffer based solution, when a delay sensitive packet finally arrives, a grant request will be triggered directly and switch DRX to ON. This means that the grant request for delay-tolerant packet(s) previously stored in the pre-buffer 120 will also be transmitted as soon as the DRX ON period has started.

The UE 100 is therefore normally configured to directly trigger, when the uplink packet is regarded as delay sensitive, transmission of the request for an uplink transmission grant.

Figure 7:
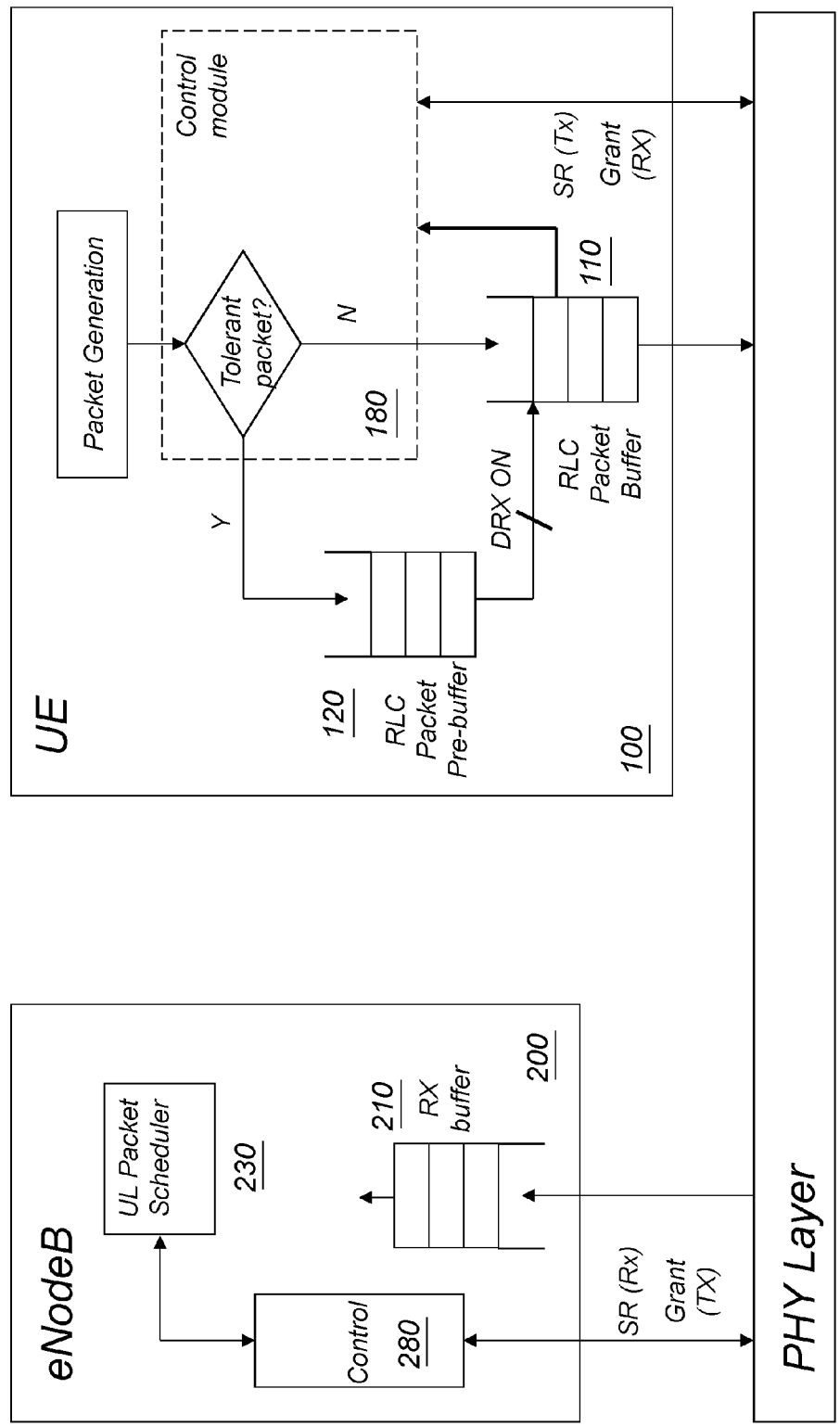
FIG. 7 is a schematic block diagram illustrating an example of a UE and eNodeB including physical layer communication according to an embodiment.

FIG. 7 is a schematic block diagram illustrating an example of a UE and eNodeB including physical layer communication according to an embodiment. This example is given in the non-limiting context of LTE DRX operation.

In this example, the UE includes an extra buffer, a Radio Link Control, RLC, Packet Pre-buffer 120. When an uplink packet is generated, if it is identified as delay sensitive by the control module 180, the packet is directly sent to the main RLC Packet Buffer 110 where it immediately triggers a scheduling request, SR, and wakes the UE up to DRX ON state if it is in OFF mode. However, if the packet is identified as delay tolerant by the control module 180, the packet is sent to the RLC Packet Pre-buffer and will not automatically trigger a scheduling request, SR. While a monitoring functionality monitors the DRX status, either by means of a timer or a DRX status tracker, the RLC Packet Pre-buffer 120 is emptied to the RLC Packet Buffer 110 whenever the DRX state is switched from OFF to ON. Once there are packets available in the RLC Packet Buffer 110, a scheduling request, SR, is triggered by the control module 180 for each packet in the RLC Packet Buffer 110. The scheduling request, SR, is transmitted (Tx) to the corresponding eNodeB 200 over the physical layer, PHY Layer. The eNodeB 200 receives (Rx) the scheduling request, SR, and the control module 280 of the eNodeB 200 forwards the SR to an uplink packet scheduler 230, which is responsible for issuing uplink grants. Once an uplink grant is issued and transmitted (Tx) by the eNodeB 200 to the UE 100, and subsequently received (Rx) by the UE, the uplink packet can actually be transmitted from the UE. The uplink packet is then transmitted from the RLC Packet Buffer 110 of the UE 100 to the RX buffer 210 of the eNodeB 200.

In another example, the UE 100 is configured to directly control the timing of the transmission of the request for an uplink transmission grant to the DRX ON period. For example, the control module 180 may be configured to take the appropriate decision(s) and generate corresponding control signal(s). By way of example, the timing of a grant request such as a scheduling request, SR, may be controlled in dependence on a timer. The timer may be set in dependence on the type of the packet. When it is a delay sensitive packet, the timer may be set to zero. But when it is a delay tolerant packet, the timer can be set according to the time difference between the current time and the start time of the first DRX ON period. When the timer has expired, the transmission of the grant request is triggered. For delay tolerant packets, it is possible to readjust the timer whenever the DRX ON occasion is updated. The time to the next DRX ON can be added to the timer for delay tolerant packets, and whenever the DRX mode is updated a corresponding update of the timer can be made.

Figure 8:
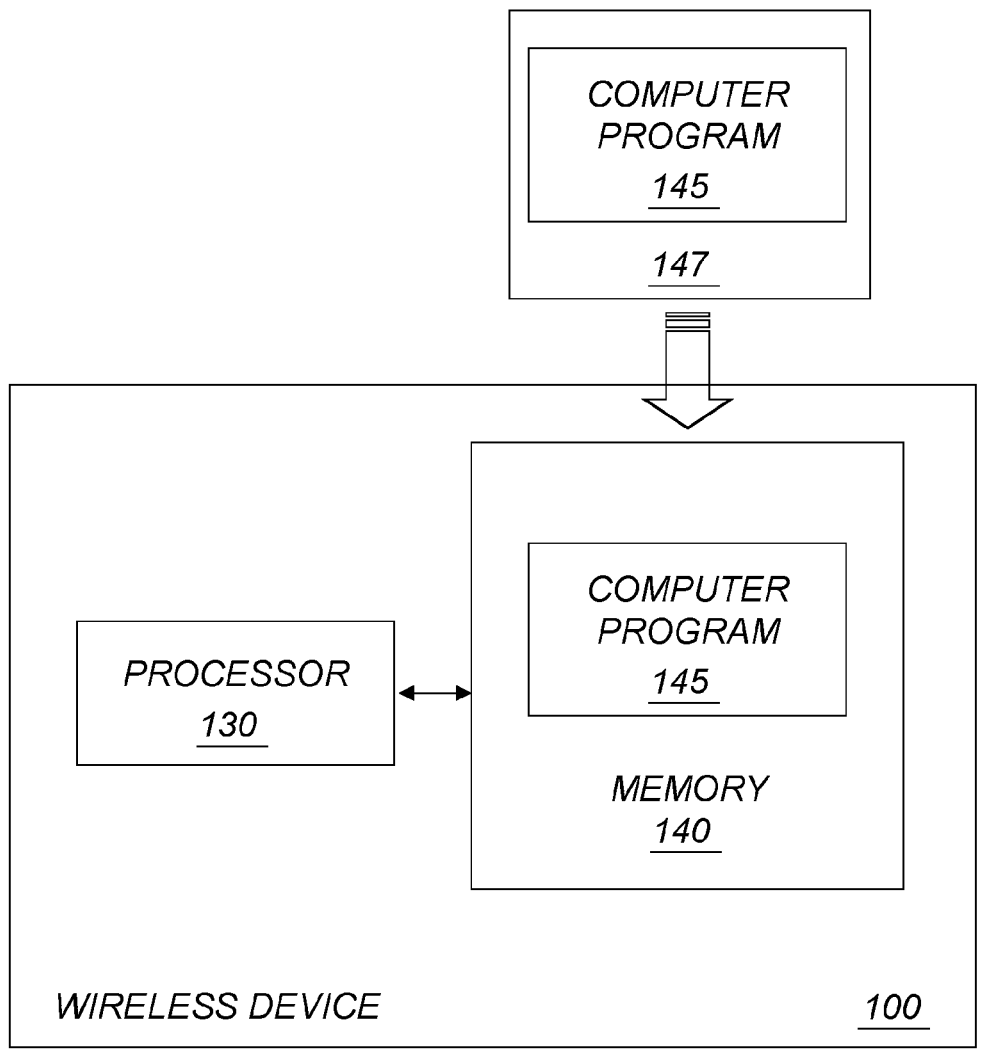
FIG. 8 is a schematic block diagram illustrating an example of a wireless device including a computer program implementation according to a particular embodiment.

FIG. 8 is a schematic block diagram illustrating an example of a wireless device including a computer program implementation according to a particular embodiment.

In this particular example, at least some of the steps, functions, procedures, modules and/or blocks described above are implemented in a computer program 145, which is loaded into the memory 140 for execution by the processor 130. The processor 130 and memory 140 are interconnected to each other to enable normal software execution. An optional input/output device may also be interconnected to the processor 130 and/or the memory 140 to enable input and/or output of relevant data such as input parameter(s) and/or resulting output parameter(s).

The term 'processor' or 'computer' should be interpreted in a general sense as any system or device capable of executing program code or computer program instructions to perform a particular processing, determining or computing task.

In a particular embodiment, there is provided a computer program for operating, when executed by the processor 130, a wireless device 100 in a wireless communication network. It is assumed that the wireless device 100 is configured for Discontinuous Reception, DRX, operation with a DRX cycle having a DRX ON period in which the wireless device is in a DRX awake state and ready for reception and a DRX OFF period in which the wireless device is in a DRX sleep state. The computer program 145 comprises instructions executable by the processor 130, whereby the processor 130 is operative to determine whether an uplink packet to be transmitted is delay tolerant, and to cause, when the uplink packet is regarded as delay tolerant, a delay of the uplink packet in dependence on the DRX state of the wireless device 100.

The software or computer program 145 may be realized as a computer program product, and is normally carried or stored on a computer-readable medium 140, 147. By way of example, the computer-readable medium may include one or more removable or non-removable memory devices including, but not limited to a Read-Only Memory, ROM, a Random Access Memory, RAM, a Compact Disc, CD, a Digital Versatile Disc, DVD, a Universal Serial Bus, USB, memory, a Hard Disk Drive, HDD storage device, a flash memory, or any other conventional memory device. The computer program 145 may thus be loaded into an operating memory 140 for execution by processor 130.

For example, the computer program stored in memory includes program instructions executable by the processing circuitry, whereby the processing circuitry is able or operative to execute the herein-described steps, functions, procedure and/or blocks.

The wireless device is thus configured to perform, when executing the computer program, well-defined processing tasks such as those described herein.

The computer or processing circuitry does not have to be dedicated to only execute the herein-described steps, functions, procedure and/or blocks, but may also execute other tasks.

As indicated herein, the wireless device may alternatively be defined as a group of function modules, where the function modules are implemented as a computer program running on a processor.

Figure 9:
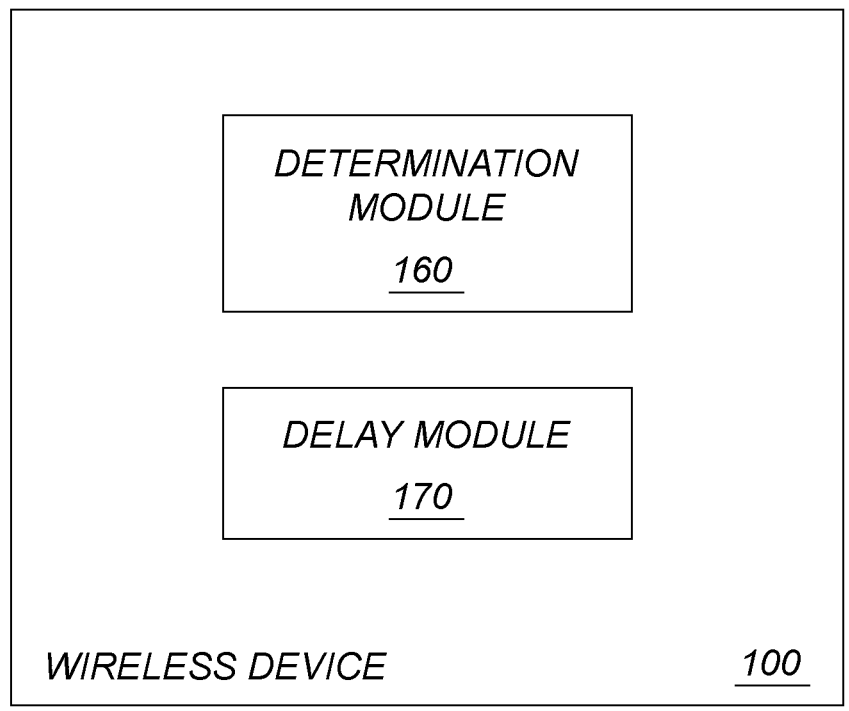
FIG. 9 is a schematic block diagram illustrating an example of a wireless device according to another embodiment.

The computer program residing in memory may thus be organized as appropriate function modules configured to perform, when executed by the processor, at least part of the steps and/or tasks described herein. An example of a wireless device 100 comprising a group of such function modules is illustrated in FIG. 9.

In this example, the wireless device 100 comprises a determination module 160 for determining whether an uplink packet to be transmitted is delay tolerant. The wireless device 100 also comprises a delay module 170 for causing, when the uplink packet is regarded as delay tolerant, a delay of the uplink packet in dependence on the DRX state of the wireless device.

In a particular example, the delay module 170 is operable for causing, when the uplink packet is regarded as delay tolerant, a delay of a request for an uplink transmission grant for the uplink packet until a DRX ON period of the wireless device. This means that the delay module 170 is operable for causing a delay of a request for an uplink transmission grant for delay tolerant uplink packets until a DRX ON period.

Preferably, the transmission opportunities for transmitting requests for uplink grants may be allocated or scheduled in dependence on, i.e. based on or dependent on, the DRX ON periods. Although this is not necessary, it has turned out to be beneficial for ensuring reasonable delays even for delay-tolerant uplink packets. It is also possible to use other alignment procedures.

Figure 10:
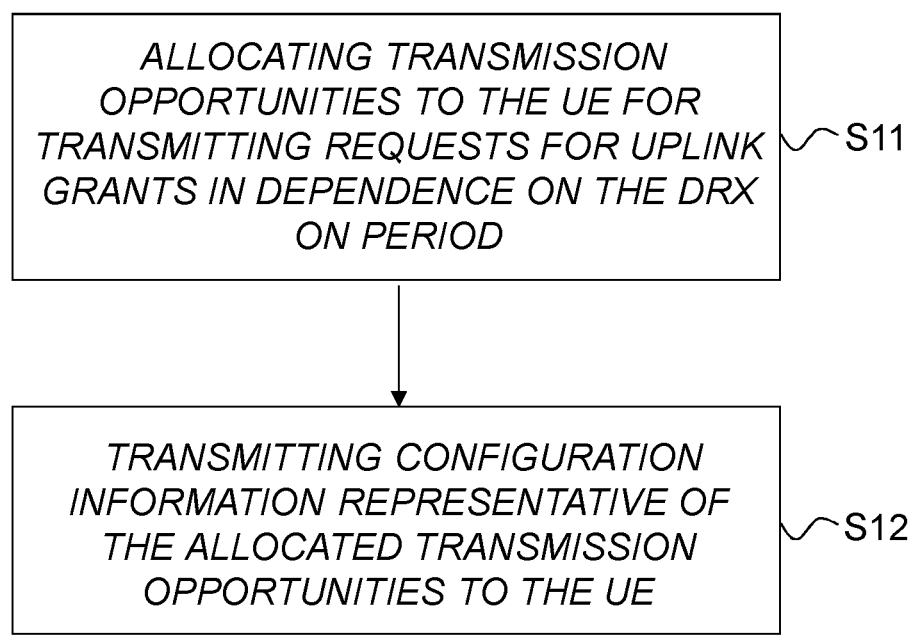
FIG. 10 is a schematic flow diagram illustrating an example of a method performed by a radio network node for configuring a User Equipment, UE, for operation in a wireless communication network according to an embodiment.

FIG. 10 is a schematic flow diagram illustrating an example of a method performed by a radio network node for configuring a User Equipment, UE, for operation in a wireless communication network according to an embodiment. In step S11, the radio network node is allocating transmission opportunities to the UE for transmitting requests for uplink transmission grants in dependence on the DRX ON period of a DRX cycle of the UE. In step S12, the radio network node is transmitting configuration information representative of the allocated transmission opportunities to the UE for enabling configuration of the UE.

In this way, it is possible to configure the UE with transmission opportunities for transmitting requests for uplink transmission grants in a way that effectively supports reduced power consumption and battery savings.

By way of example, the timing of the transmission opportunities may be determined in dependence on, i.e. based on or dependent on, the DRX ON period of the DRX cycle to align at least part of the transmission opportunities with the DRX ON period of the DRX cycle. The transmission opportunities are then allocated based on the determined timing. This will enable a reduction of the power consumption on the UE side while ensuring reasonable delays of the requests for uplink grants for delay-tolerant uplink packets.

As mentioned above, the requests for uplink transmission grants may for example be Scheduling Requests, SRs, to be transmitted on the Physical Uplink Control Channel, PUCCH, for requesting uplink transmission resources.

As an example, the configuration information for the DRX operation and the transmission opportunities for requesting uplink grants preferably includes information representative of periodicity and time offset; DRX ON periodicity and offset, and transmission opportunity periodicity and offset. Preferably, the time offset modular the periodicity should be the same for the transmission opportunities and DRX ON periods.

Figure 11:
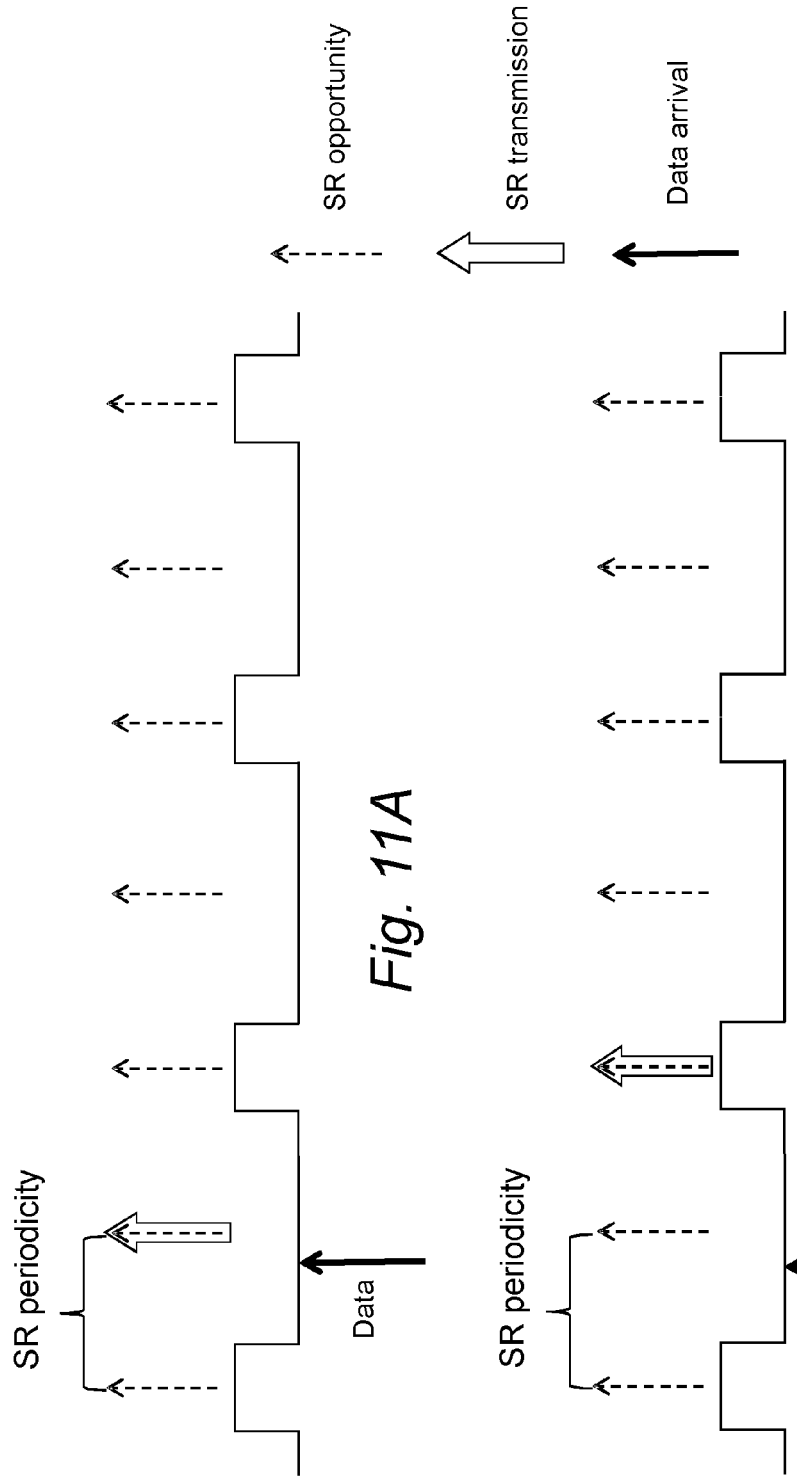
FIG. 11A is a schematic signaling and timing diagram illustrating an example of SR and DRX ON alignment without delaying the SR request according to an embodiment.
FIG. 11B is a schematic signaling and timing diagram illustrating an example of SR and DRX ON alignment when delaying the SR request until a DRX ON period according to an embodiment.

FIG. 11A and FIG. 11B schematically illustrate examples of alignment of the transmission opportunities for transmitting scheduling requests, SRs, with the DRX ON periods.

FIG. 11A is a schematic signaling and timing diagram illustrating an example of SR and DRX ON alignment without delaying the SR request according to an embodiment. When a delay sensitive uplink packet is generated, the actual SR transmission is normally performed at the next possible SR opportunity, as indicated in FIG. 11A.

FIG. 11B is a schematic signaling and timing diagram illustrating an example of SR and DRX ON alignment when delaying the SR request until a DRX ON period according to an embodiment. When a delay tolerant packet is generated, the SR transmission is normally delayed until the next possible SR opportunity that coincides with a DRX ON period, as indicated in FIG. 11B.

By allocating SR transmission opportunities to the UE in dependence on the DRX ON period of the DRX cycle, an effective alignment of SR opportunities with DRX ON periods can be achieved so that the delay can be minimized or at least held at a reasonable level. In other words, it is thus possible to find an SR transmission opportunity that occurs during a DRX ON period within a relatively short period of time.

Figure 12:
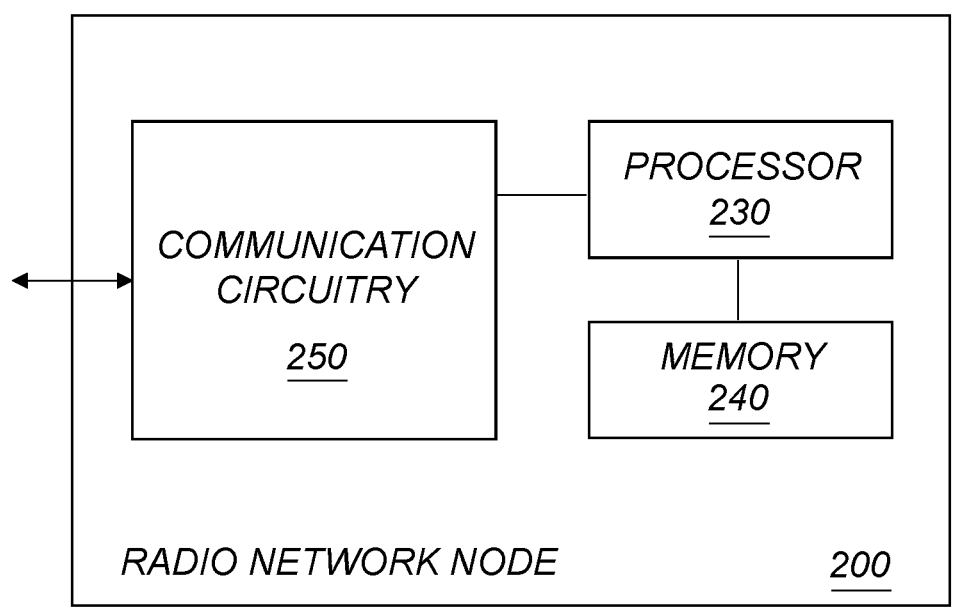
FIG. 12 is a schematic block diagram illustrating an example of a radio network node according to an embodiment.

FIG. 12 is a schematic block diagram illustrating an example of a radio network node operable for configuring a UE for operation in a wireless communication network according to an embodiment. In this example, the radio network node 200 is configured to allocate transmission opportunities to the UE for transmitting requests for uplink transmission grants in dependence on the DRX ON period of a DRX cycle of the UE. The radio network node 200 is also configured to transmit configuration information representative of the allocated transmission opportunities to the UE for enabling configuration of the UE.

By way of example, the radio network node 200 is configured to determine the timing of the transmission opportunities in dependence on the DRX ON period of the DRX cycle to align at least part of the transmission opportunities with the DRX ON period of the DRX cycle, and the radio network node is then configured to allocate the transmission opportunities based on the determined timing.

As exemplified in FIG. 12, the radio network node 200 may include a processor 230 and a memory 240, wherein the memory 240 comprises instructions executable by the processor 230 to enable the configuration of the UE.

The instructions are normally organized in a computer program, which may be realized as a computer program product, and carried or stored on a computer-readable medium.

The radio network node 200 also includes communication circuitry 250 for wired and/or wireless communication with one or more other nodes, including transmitting and/or receiving information. This may for example be radio communication circuitry such as a radio transceiver for transmitting the configuration information to the relevant UE.

As an example, the radio network node 200 is a base station, such as an eNodeB.

The radio network node may alternatively be defined as a group of function modules, where the function modules are implemented as a computer program running on a processor.

The computer program residing in memory may thus be organized as appropriate function modules configured to perform, when executed by the processor, at least part of the steps and/or tasks described above.

Figure 13:
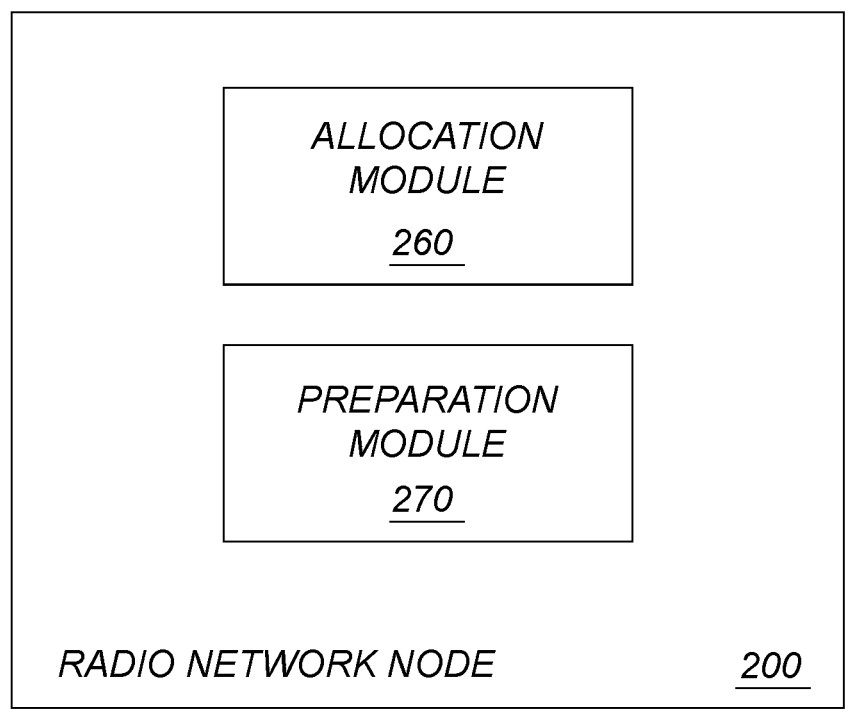
FIG. 13 is a schematic block diagram illustrating an example of a radio network node according to another embodiment.

An example of a radio network node 200 comprising a group of such function modules is illustrated in FIG. 13.

FIG. 13 is a schematic block diagram illustrating an example of a radio network node operable for configuring a UE for operation in a wireless communication network according to another embodiment. In this example, the radio network node 200 comprises an allocation module 260 and a preparation module 270. The allocation module 260 is configured for allocating transmission opportunities to the UE for transmitting requests for uplink transmission grants in dependence on the DRX ON period of a DRX cycle of the UE. The preparation module 270 is configured for preparing for transmission of configuration information representative of the allocated transmission opportunities to the UE.

The embodiments described above are merely given as examples, and it should be understood that the proposed technology is not limited thereto. It will be understood by those skilled in the art that various modifications, combinations and changes may be made to the embodiments without departing from the present scope as defined by the appended claims. In particular, different part solutions in the different embodiments can be combined in other configurations, where technically possible.

REFERENCES

[1] US 2013/210420
[2] WO 2007/149732
[3] US 2013/021995
[4] GB 2493713

The invention claimed is:

1. A method of operating a User Equipment, UE, in a wireless communication network, the UE being configured for Discontinuous Reception, DRX, operation with a DRX cycle having a DRX ON period in which the UE is in a DRX awake state and ready for reception and a DRX OFF period in which the UE is in a DRX sleep state, the method comprising:

the UE determining whether an uplink packet to be transmitted is delay tolerant, where determining whether an uplink packet to be transmitted is delay tolerant is performed on a packet-by-packet basis by inspecting the packet below an Internet Protocol (IP) layer; and in response to determining the uplink packet is delay tolerant, the UE delaying a request for an uplink transmission grant for the uplink packet until a DRX ON period of the UE, wherein delaying, when the uplink packet is regarded as delay tolerant, the request for the uplink transmission grant until the DRX ON period of the UE comprises directly controlling a timing of the transmission of the request for an uplink transmission grant to the DRX ON period;

wherein the UE has a primary packet buffer configured to store the uplink packet, and wherein delaying, when the uplink packet is regarded as delay tolerant, a request for an uplink transmission grant until a DRX ON period of the UE comprises:

temporarily storing the uplink packet in a packet pre-buffer; and transferring the uplink packet from the packet pre-buffer into the primary packet buffer when the UE is in the DRX ON period, wherein a presence of an uplink packet in the primary packet buffer triggers transmission of the request for an uplink transmission grant.

2. The method of claim 1, wherein delaying, when the uplink packet is regarded as delay tolerant, a request for an uplink transmission grant until a DRX ON period of the UE is based on keeping track of a DRX state by one of:

a timer that counts down to a start of the DRX ON period; and a DRX state tracker which indicates the DRX state.

3. The method of claim 1, wherein the request for an uplink transmission grant is a Scheduling Request, SR, to be transmitted on the Physical Uplink Control Channel, PUCCH, for requesting uplink transmission resources for the uplink packet.

4. The method of claim 1, wherein the UE is directly triggering, when the uplink packet is regarded as delay sensitive, transmission of the request for an uplink transmission grant.

5. A User Equipment, UE, configured for operation in a wireless communication network, the UE being configured for Discontinuous Reception, DRX, operation with a DRX cycle having a DRX ON period in which the UE is in a DRX awake state and ready for reception and a DRX OFF period in which the UE is in a DRX sleep state, the UE being configured to:

determine whether an uplink packet to be transmitted is delay tolerant; and in response to determining the uplink packet is delay tolerant, delay, a request for an uplink transmission grant for the uplink packet until a DRX ON period of the UE, wherein the request for an uplink transmission grant is a Scheduling Request, SR, to be transmitted on a Physical Uplink Control Channel, PUCCH, for requesting uplink transmission resources for the uplink packet;

directly control a timing of the transmission of the request for an uplink transmission grant to the DRX ON period; and have a primary packet buffer configured to store the uplink packet, and the UE is configured to temporarily store the uplink packet in a packet pre-buffer, and to transfer the uplink packet from the packet pre-buffer into the primary packet buffer when the UE is in the DRX ON period, wherein a presence of an uplink packet in the primary packet buffer triggers transmission of the request for an uplink transmission grant.

6. The UE of claim 5, wherein the UE is configured to keep track of the DRX state by one of:

a timer that counts down to a start of the DRX ON period; and a DRX state tracker which indicates the DRX state.

7. The UE of claim 5, wherein the UE is configured to directly trigger, when the uplink packet is regarded as delay sensitive, transmission of the request for an uplink transmission grant.

8. The UE of claim 5, wherein the UE comprises a processor and a memory, wherein the memory comprises instructions executable by the processor to perform operations of the UE.

9. A wireless device for operation in a wireless communication network, the wireless device being configured for Discontinuous Reception, DRX, operation with a DRX cycle having a DRX ON period in which the wireless device is in a DRX awake state and ready for reception and a DRX OFF period in which the wireless device is in a DRX sleep state, the wireless device comprises:

a determination module for determining whether an uplink packet to be transmitted is delay tolerant; and a delay module for causing, in response to determining the uplink packet is delay tolerant, a delay of the uplink packet in dependence on the DRX state of the wireless device, wherein the delay module directly controls a timing of the transmission of the request for an uplink transmission grant to the DRX ON period; and a primary packet buffer for storing the uplink packet, and wherein the delay module delays, when the uplink packet is regarded as delay tolerant, the request for the uplink transmission grant until the DRX ON period of the UE by:

temporarily storing the uplink packet in a packet pre-buffer; and transferring the uplink packet from the packet pre-buffer into the primary packet buffer when the UE is in the DRX ON period, wherein a presence of an uplink packet in the primary packet buffer triggers transmission of the request for an uplink transmission grant.

10. A computer memory storing a computer program for operating, when executed by a processor, a wireless device in a wireless communication network, the wireless device being configured for Discontinuous Reception, DRX, operation with a DRX cycle having a DRX ON period in which the wireless device is in a DRX awake state and ready for reception and a DRX OFF period in which the wireless device is in a DRX sleep state, the computer program comprises instructions executable by the processor that cause the processor to:

determine whether an uplink packet to be transmitted is delay tolerant; and in response to determining the uplink packet is delay tolerant cause a delay of the uplink packet in dependence on the DRX state of the wireless device, wherein the delay of the uplink packet comprises directly controlling a timing of a transmission of a request for an uplink transmission grant to a DRX ON period;

wherein the wireless device has a primary packet buffer configured to store the uplink packet, and wherein the instructions cause the processor to delay, when the uplink packet is regarded as delay tolerant, the request for the uplink transmission grant until the DRX ON period of the UE by:

temporarily storing the uplink packet in a packet pre-buffer; and transferring the uplink packet from the packet pre-buffer into the primary packet buffer when the UE is in the DRX ON period, wherein a presence of an uplink packet in the primary packet buffer triggers transmission of the request for an uplink transmission grant.

* * * * *